Jan. 9, 1962  A. M. JACKES  3,016,214
AIRCRAFT TAKE-OFF ASSIST DEVICE
Filed Sept. 1, 1959  2 Sheets-Sheet 1

INVENTOR:
ARTHUR M. JACKES
BY:
Beau, Brooks, Buckley & Beau,
ATTORNEYS.

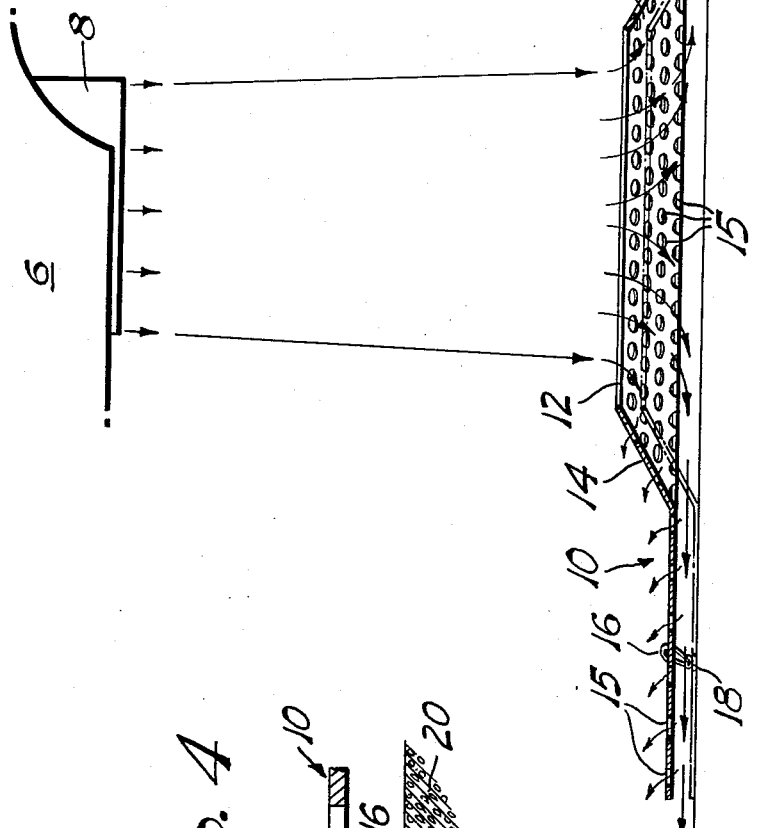
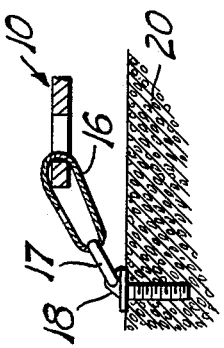

United States Patent Office 3,016,214
Patented Jan. 9, 1962

3,016,214
AIRCRAFT TAKE-OFF ASSIST DEVICE

Arthur M. Jackes, Williamsville, N.Y., assignor, by mesne assignments, to Bell Aerospace Corporation, Wheatfield, N.Y., a corporation of Delaware
Filed Sept. 1, 1959, Ser. No. 837,519
12 Claims. (Cl. 244—63)

This invention relates to aircraft take-off facilitating devices, and more particularly to downwardly directed jet blast impingement flow modifier for use with vertical take-off and landing aircraft.

One of the major problems encountered in the development of VTOL type aircraft, particularly for those which take off and land in horizontal attitude with their wings substantially parallel to the ground, has been "ground effect," i.e., the effect caused by the blast from the downwardly directed jet stream striking the ground and inducing turbulent currents in the free air by a mixing and pumping action. It has been determined that in the case of aircraft with horizontally oriented wings, the turbulent air currents resulting from impingement of the take-off jet blast against the ground, engulf at least the outer portions of the wings and greatly hamper take-off. In some cases such conditions have actually prevented the aircraft from leaving the ground.

Accordingly, a primary object of the present invention is to provide means for reducing or eliminating the adverse effects induced by the jet blast onto the ground on an aircraft of the VTOL type.

Another object of the invention is to provide an improved means for the purposes aforesaid which is of the simplest possible nature and which will be easy and inexpensive to maintain in use.

Other objects and advantages of the invention will appear from the detailed description hereinafter and the accompanying drawings wherein.

Figure 2:
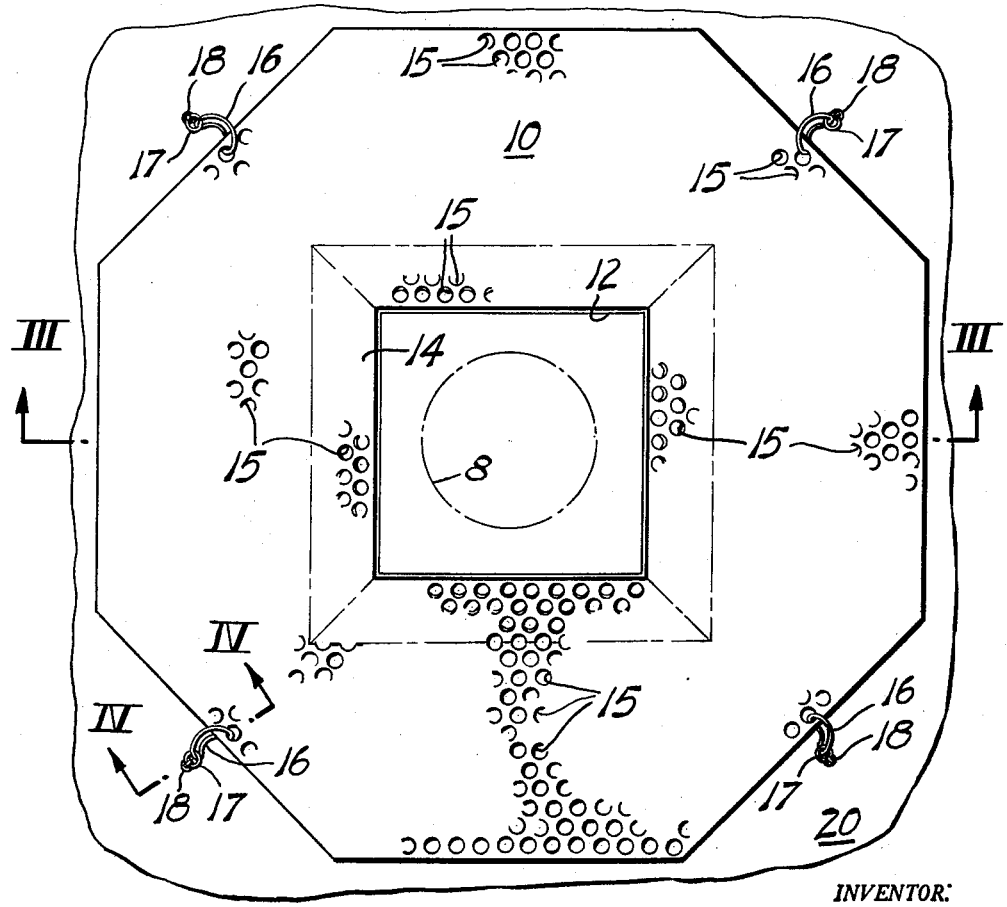
FIG. 2 is a top plan view, on enlarged scale, of the flow modifier of FIG. 1.

FIG. 3 is a partly diagrammatical view and partly a sectional view, on further enlarged scale taken on line III—III of FIG. 2, showing in solid lines the flow modifier in operating position and in broken lines the device at rest; and FIG. 4 is a fragmentary sectional view, on enlarged scale, taken on line IV—IV of FIG. 2 showing a detail of the construction. With a view to obtaining the required blast impingement flow modification by the simplest and least expensive means, I have developed a small, easily fabricated take-off platform which may be built of very inexpensive materials. The device efficiently performs its function of reducing ground effect by modifying the mixing between the jet blast flowing on the surface of the ground with free air, said mixing being a principal cause of the induced ground effect, and dissipating the energy thereof.

Referring now to the drawing, an aircraft 6 having a downwardly directed jet outlet 8 is shown in position over the flow modifier of the invention which is designated generally at 10. The flow modifier comprises a plate-like device which may be formed of a single piece of perforated sheet steel cut and bent generally into a hat shape, or it may be made up of several pieces of metal welded or otherwise fastened together with suitable structural strength and stiffness provided. In any case it is formed with a flat rim portion 11 and a central opening 12, with an inclined ramp portion 14 therebetween. Whereas it is shown to be substantially square in plan view, it may be circular in form or otherwise shaped.

Figure 1:
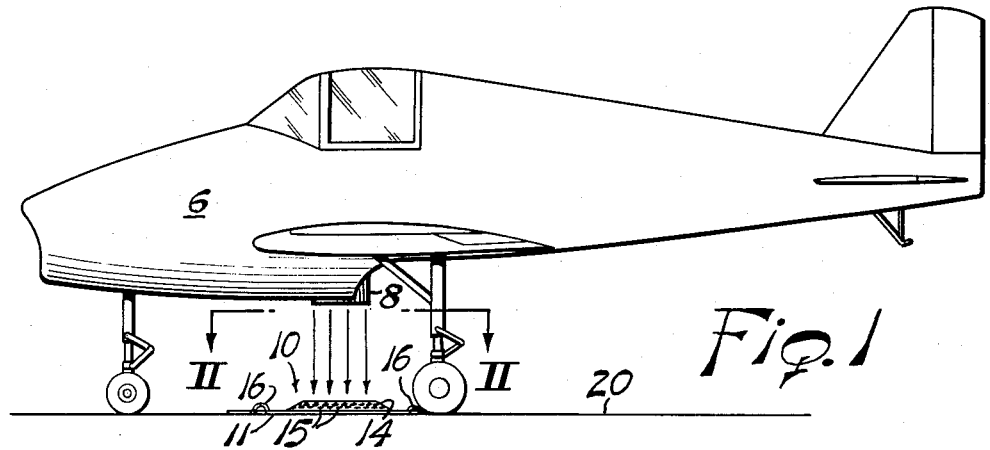
FIG. 1 is a side elevational view showing one form of the blast flow modifier of the invention in position for use with an aircraft.

When in use, the plate is positioned beneath an aircraft so that the downwardly directed jet blast of the aircraft will pass through the central opening 12 (FIGS. 1, 2, 3). As stated, the plate is formed to include an upwardly slanted portion 14 surrounding the opening 12, to provide the plate with lift producing means; the slanted portion 14 being in turn surrounded by the flat rim portion. All parts of the device are perforated as indicated at 15.

It is an important feature of the invention that the flow modifier is so arranged that it will be lifted slightly by and will float upon the radially deflected jet blast; but provision is made for tying the plate to the ground to restrict movements thereof within a certain desirable range. In the form of the invention illustrated wire cable loops 16 passing through suitable apertures in the plate 10 and through rings 17 attached to eye bolts 18 embedded in a concrete ground pad 20 serve to provide the tie down means; but any other arrangement may of course be used, as preferred.

In operation, preparatory to take-off an aircraft is positioned over the tethered flow modifier so that its downwardly directed jet blast will pass into the central opening 12 of the device. Then when the jet blast impinges against the ground it will be deflected radially as shown by the arrows in FIG. 3, and this radially thrusting blast will act on the inclined area 14 of the flow modifying plate to lift the plate. This lifting of the plate 10 will absorb some of the energy of the jet blast and will also provide an increased radial escape path of limited height beneath the plate (FIG. 3) which will further divert the weakened jet blast radially and in horizontal directions beneath the aircraft and parallel to the wings thereof. The energy dissipation effect and control of mixing between the jet blast and free air is increased severalfold by providing the perforations through the plate as indicated at 15 so as to give a total of open areas approximating 50% of the overall plate area.

It has been found that with this combination action of energy dissipation and modified mixing of the jet blast with free air a relatively small flow modifier plate may be used. Tests show that a plate having an area of about ten times the diameter of the jet stream diameter with a central opening of about one and one-half times the size of the jet stream, which is tethered to limit its rise above the ground to about one-tenth the jet diameter, will serve to reduce the "ground effect" of maximum take-off thrust so as to virtually eliminate it as a consideration. Thus it will be seen that my invention provides a very simple and inexpensive but effective solution to the "ground effect" problem; and it will of course be understood that although only one form of the invention has been illustrated and described in detail hereinabove, it will be understood that various changes may be made therein without departing from the spirit of the invention or the scope of the following claims.

I claim:

1. A jet blast flow modifier comprising a plate-like device having a substantially flat outer rim portion adapted to lie horizontally upon an aircraft take-off surface, said device having a centrally located opening therethrough thereby defining an inner rim portion radially spaced from the outer rim portion thereof, said opening being adapted to be positioned directly beneath a jet blast and being of such dimension that substantially all of the jet blast passes through said opening, the device being shaped so that said inner rim portion is at a higher elevation than said outer rim portion, said device being perforated substantially throughout its extent between said inner and outer rim portions, and tie-down means holding said device against substantial displacements in radial directions while permitting said device to rise a limited distance above said take-off surface.

2. A jet blast flow modifier comprising a plate-like device having a substantially flat outer rim portion adapted to lie horizontally upon an aircraft take-off surface, said device having a centrally located opening therethrough thereby defining an inner rim portion radially spaced from the outer rim portion thereof, said opening being adapted to be positioned directly beneath a jet blast and being of such dimension that substantially all of the jet blast passes through said opening, the device being shaped to incline downwardly from said inner rim portion to said outer rim portion, said device being perforated substantially throughout its extent between said inner and outer rim portions, and tie-down means holding said device against substantial displacements in radial directions while permitting said device to rise a limited distance above said take-off surface.

3. A jet blast flow modifier comprising a plate-like device having a substantially flat outer rim portion adapted to lie horizontally upon an aircraft take-off surface, said device having a centrally located opening therethrough thereby defining an inner rim portion radially spaced from the outer rim portion thereof, said opening being adapted to be positioned directly beneath a jet blast and being of such dimension that substantially all of the jet blast passes through said opening, the device being shaped so that said inner rim portion is at a higher elevation than said outer rim portion, and tie-down means holding said device against substantial displacements in radial directions while permitting said device to rise a limited distance above said take-off surface.

4. A jet blast flow modifier comprising a plate-like device having a substantially flat outer rim portion adapted to lie horizontally upon an aircraft take-off surface, said device having a centrally located jet blast receiving opening therethrough thereby defining an inner rim portion radially spaced from the outer rim portion thereof, said opening being adapted to be positioned directly beneath a jet blast and being of such dimension that substantially all of the jet blast passes through said opening, the device being shaped to incline downwardly from said inner rim portion to said outer rim portion whereby the jet blast entering the device mushrooms against the sloping portion thereof, said device being perforated substantially throughout its extent between said inner and outer rim portions, and tie-down means holding said device against substantial displacements in radial directions while permitting said device to rise a limited distance above said take-off surface.

5. A jet blast flow modifier comprising a plate-like device having a substantially flat outer rim portion adapted to lie horizontally upon an aircraft take-off surface, said device having a centrally located jet blast receiving opening therethrough thereby defining an inner rim portion radially spaced from the outer rim portion thereof, said opening being adapted to be positioned directly beneath a jet blast and being of such dimension that substantially all of the jet blast passes through said opening, the device being shaped so that said inner rim portion is at a higher elevation than said outer rim portion and interconnected thereto by means of sloping wall portions, and tie-down means holding said device against substantial displacements in radial directions while permitting said device to rise a limited distance above said take-off surface.

6. A jet blast flow modifier comprising a plate-like device adapted to lie horizontally upon an aircraft take-off surface, said device having jet blast receiving opening therethrough and an outer rim portion shaped to parallel the take-off surface, the device being shaped to incline downwardly from said opening to said outer rim portion, said device being perforated substantially throughout its extent between said opening and said outer rim portion, and tie-down means holding said device against substantial displacements in radial directions while permitting said device to rise a limited distance above said take-off surface.

7. For use in conjunction with a vertical take-off type aircraft having means for directing a blast of gaseous products downwardly therefrom to effect vertical take-off, a device for absorbing a substantial portion of the energy of such blast to obviate deleterious "ground effects" on the aircraft during take-off; said device comprising a plate having a flat, perforate peripheral portion normally resting on the ground surface and having a frusto-conical central portion rising upwardly from said peripheral portion, said central portion having an opening of area larger than the area of said blast, and tie-down means connecting such device to the ground surface, said tie-down means being slack when the device is in the stated normal position to permit blast-induced elevation of the device to form a blast escape passage between said peripheral portion and the ground surface whereby blast energy is dissipated in association with said perforate peripheral portion of the device.

8. A jet blast flow modifier comprising a plate-like member having a flat outer rim portion and an upwardly inclined inner portion provided with a central opening, said opening having an area about 1½ times the area of the jet blast with which it is to be associated, said member having an area of about 10 times the diameter of the jet blast diameter, said member being perforate throughout so as to give an open area approximating 50% of the over-all area of the member.

9. The modifier according to claim 8 including tether means securing said member to the ground surface, said tether means permitting the member to be elevated a distance above the ground equal to about 1/10 the jet blast diameter.

10. A jet blast flow modifier for obviating deleterious "ground effect" on aircraft during vertical take-off, comprising a plate-like device having an enlarged central take-off blast-receiving opening and a substantially flat and perforate peripheral portion adapted normally to rest upon a take-off surface, means defining a pocket between the device and the take-off surface in the region of said opening to permit blast-induced elevation of said device, and tether means connecting said device to the ground surface permitting limited elevation thereof as aforementioned.

11. The device as defined in claim 10 wherein said means is in the form of a frusto-conical portion of the device.

12. In the art of vertical take-off jet aircraft, the combination of a perforate plate adapted normally to lie substantially flat upon a take-off surface and having an enlarged, substantially centrally disposed jet blast-receiving opening, and tether means connecting said plate to the take-off surface permitting limited elevation thereof above the take-off surface to dissipate the energy of the jet blast and substantially reduce "ground effect" deleterious to aircraft take-off.

References Cited in the file of this patent

UNITED STATES PATENTS

| | | |
|---|---|---|
| 1,914,573 | Kookogey | June 20, 1933 |
| 2,683,002 | Adams et al. | July 6, 1954 |

FOREIGN PATENTS

| | | |
|---|---|---|
| 441,652 | Germany | Mar. 7, 1927 |
| 451,376 | Italy | Sept. 7, 1949 |
| 1,186,310 | France | Feb. 23, 1959 |

OTHER REFERENCES

Evening Star Article, Oct. 22, 1941.